US008429001B2

(12) United States Patent
Dance et al.

(10) Patent No.: US 8,429,001 B2
(45) Date of Patent: Apr. 23, 2013

(54) LIMITED LOTTERY INSURANCE

(75) Inventors: Christopher R. Dance, Grenoble (FR);
Onno Zoeter, Grenoble (FR);
Guillaume M. Bouchard, Crolles (FR)

(73) Assignee: Xerox Corporation, Norwalk, CT (US)

( * ) Notice: Subject to any disclaimer, the term of this patent is extended or adjusted under 35 U.S.C. 154(b) by 292 days.

(21) Appl. No.: 12/792,254

(22) Filed: Jun. 2, 2010

(65) Prior Publication Data

US 2011/0302041 A1 Dec. 8, 2011

(51) Int. Cl.
*G06Q 30/00* (2012.01)

(52) U.S. Cl.
USPC .......................................................... 705/7.35

(58) Field of Classification Search .................. 705/7.35
See application file for complete search history.

(56) References Cited

U.S. PATENT DOCUMENTS

| 2003/0119585 A1 * | 6/2003 | Walker et al. .................. 463/25 |
| 2005/0216391 A1 * | 9/2005 | Tews ................................ 705/37 |
| 2005/0289043 A1 * | 12/2005 | Maudlin .......................... 705/37 |
| 2007/0105612 A1 * | 5/2007 | Fotevski ......................... 463/16 |
| 2008/0103909 A1 * | 5/2008 | Huang et al. .................... 705/14 |
| 2008/0177625 A1 * | 7/2008 | Mehdian ......................... 705/14 |

OTHER PUBLICATIONS

Sonsino, Doron, "Disappointment Aversion in Internet Bidding-Decisions," Theory and Decision, 64, 2008, pp. 363-393.*
Amrhein, Chris, "Taken for a Ride by the Stated Amount Endorsement," American Agent & Broker, Mar. 2002, pp. 14 and 16.*
Briest et al., "Pricing Randomized Allocations," Proc. 21st Annual ACM-SIAM Symp. on Discrete Algorithms (Ed., Moses Charikar, Jan. 2010).*
Heckscher, Melissa, "Callers," Daily Breeze, Torrance, California, May 27, 2007, p. B.1.*
Anonymous, "'Ghost Hunters' Returning to Port City," Star-News, Wilmington, North Carolina, Jan. 20, 2009.*
Fleming, D., "Crystal Lake's Ice Fishing Derby Will Help Military," Portland Press Herald, Dec. 27, 2009, p. 1.*
U.S. Appl. No. 12/695,757, filed Jan. 28, 2010, Dance, et al.
U.S. Appl. No. 12/792,028, filed Jun. 2, 2010, Dance, et al.
U.S. Appl. No. 12/792,267, filed Jun. 2, 2010, Dance, et al.
U.S. Appl. No. 12/792,124, filed Jun. 2, 2010, Dance, et al.
Manelli, et al. "Pricing mechanism design: Revenue maximization and the multiple-good monopoly," J. *Economic Theory*, 137:153-185 (2007).
Briest, et al. "Pricing Randomized Allocations," Proc. 21st Annual ACM-SIAM Symp. on Discrete Algorithms (*Ed., Moses Charikar*, Jan. 2010).
Aguilera, et al. "On convex functions and the finite element method," SIAM Journal on Numerical Analysis 47(4):3139-3157, (2009).

(Continued)

*Primary Examiner* — Nathan Erb
(74) *Attorney, Agent, or Firm* — Fay Sharpe LLP (57) ABSTRACT

A system and method for conducting a lottery for at least one item are provided. The method includes, for each of a plurality of buyers, receiving a buyer's declared valuation for each of at least one item being offered in a lottery by a seller, the item having an assigned non-deterministic probability of being allocated to the buyer, providing insured prices for outcomes of the lottery which are a function of the buyer's declared valuation of the at least one item, randomly drawing an allocation of each of the at least one item to a respective one of the buyers, based on its assigned non-deterministic probability, and allocating the insured prices to the buyers based on respective outcomes of the random drawing.

18 Claims, 6 Drawing Sheets

OTHER PUBLICATIONS

Farias, et al. "Revenue Management Beyond 'Estimate then Optimize,'" PhD. Dissertation, Stanford University (2007).

Avis, D. "IRS: A Revised Implementation of the Reverse Search Vertex Enumeration Algorithm," In: Polytopes—Combinatorics and Computation, G. Kalai & G. Ziegler eds., Birkhauser-Verlag, DMV Seminar Band 29, pp. 177-198 (2000).

Lai, et al. "Adaptive treatment allocation and the multi-armed bandit problem," The Annals of Statistics, 1987.

R. Agrawal, "Sample mean based index policies with O (log n) regret for the multi-armed bandit problem," Advances in Applied Probability, 1995.

Auer, et al. "Finite-time analysis of the multiarmed bandit problem," Machine Learning,(2002).

Chaloner, et al. "Bayesian Experimental Design: A Review," *Statistical Science*, (3):273-304 (1995).

Genz, et a. "Comparison of methods for the computation of multivariate-t probabilities," Journal of Computational and Graphical Statistics, 1993.

Bulla, et al. "Bayesian Nonparametric Estimation of a Bivariate Survival Function," Statistica Sinica, 17, 427-444 (2007).

Minka, T., Expectation Propagation for Approximate Bayesian Inference. *Proc. 17$^{th}$ Annual Conf. Uncertainty in Artificial Intelligence* (2001); and Minka, T., A family of algorithms for approximate Bayesian inference. PhD Thesis, MIT (2001).

Avis, D. "Reverse Search for Enumeration," Nov. 3, 1993.

Aloysius, et al. Leveraging Revealed Preference Information by Sequentially Pricing Multiple Products (2009), http://comp.uark.edu/~cdeck/Leveraging%20Revealed%20Preference%20Information%20by%20Sequentially%20Pricing%20Multiple%20Products.pdf.

Laibson, et al. "Golden eggs and hyperbolic discounting," Quarterly Journal of Economics, 112(2):443-77 (1997).

Xie, et al. "Advance Selling Theory, in Handbook of Pricing Research in Marketing," (Vithala R. Rao, Ed. (2007).

oDesk® (see www.odesk.com) accessed May 17, 2010.

Elance™ (see www.elance.com) accessed May 17, 2010.

Thanassoulis, J. "Haggling over Substitutes," Sep. 2003.

Pavan, et al. "Dynamic Design: Incentive Compatibility, Profit Maximization and Information Disclosure," May 8, 2009.

Carvalho, et al. "Dynamic Optimization and Learning: How Should a Manager Set Prices when the Demand Function is Unknown?" Sep. 2005.

Araman, et al. "Dynamic Pricing for Non-Perishable Products with Demand Learning," *DIMACS Workshop on Yield Management and Dynamic Pricing*, Aug. 2005.

Avis, et al. "A Pivoting Algorithm for Convex Hulls and Vertex Enumeration of Arrangements and Polyhedra," Nov. 1990.

Lobo, et al. "Pricing and learning with uncertain demand," Nov. 2003.

Kleinberg,et al. "The Value of Knowing a Demand Curve: Bounds on Regret for On-line Posted Price Auctions," Jul. 21, 2004.

Capet, et al. "A Risk Assessment System with Automatic Extraction of Event Types," *IFIP International Federation for Information Processing*, vol. 288, pp. 220-229, 2008.

"Pay-what-you-like restaurants", http://www.cnn.com/2008/TRAVEL/04/01/flex.payment/index.html (last accessed May 7, 2010).

Asmuth et al., "A Bayesian Sampling Approach to Exploration in Reinforcement Learning", 25th UAI, pp. 19-26, 2009.

Roberts, "The characterization of implementable choice rules", in Jean-Jacques Laffont, editor, Aggregation and Revelation of Preferences. Papers presented at the 1st European Summer Workshop of the Econometric Society, pp. 321-349. North-Holland, 1979 (Description only).

Minka, "A family of algorithms for approximate Bayesian inference", PhD Thesis, MIT (2001).

T. Heskes, and O. Zoeter, "Expectation Propagation for Approximate Inference in Dynamic Bayesian Networks", Proc. 18$^{th}$ Annual Conf. Uncertainty in Artificial Intelligence (2002).

Infanger, "Large-Scale Systems and Benders Decomposition", Lecture Notes, MS&E348, Stanford University (2009).

http://en.wikipedia.org/wiki/Dirichlet distribution accessed Jun. 30, 2010.

Simon, C. "Dynamic Pricing with Demand Learning under Competition," Ingenieur des Arts et Manufactures 2004, MIT 2007, pp. 1-202.

\* cited by examiner

LIMITED LOTTERY INSURANCE

CROSS REFERENCE TO RELATED PATENTS AND APPLICATIONS

Cross reference is made to the following co-pending applications, all filed on Jun. 2, 2010, the disclosures of which are incorporated herein by reference in their entireties:

application Ser. No. 12/792,028, entitled LEARNING OPTIMAL PRICES, by Christopher R. Dance and Onno Zoeter;

application Ser. No. 12/792,124, entitled MACHINE LEARNING FOR OPTIMIZATION AND SERVICES, by Christopher R. Dance and Onno Zoeter;

application Ser. No. 12/792,267, entitled MULTI-DIMENSIONAL PRICE DETERMINATION, by Christopher R. Dance and Onno Zoeter.

BACKGROUND

The exemplary embodiment relates to a method and system of selling goods and services. It finds particular application in connection with sales by lottery and in some cases, for establishing optimal pricing for later sales by conventional methods.

A buyer considering a purchase is likely to buy an item if the value that he places on the item is greater than the price he will have to pay for the item. However, buyers rarely value only one alternative when considering a purchase. There may be near-substitute products (e.g., multiple TVs), alternative payment methods (e.g., corresponding to different buyer time discounting or interest rates), varying quantities and qualities of the same product, or different expectations about mean future values (e.g., when advance-selling the same item, which can result in arbitrarily more profit than selling one item at a time). All of these factors can affect whether or not a buyer will purchase a given item. From the seller's perspective, each potential buyer has his own value placed on an item, which the seller does not know and can only estimate from prior sales (if a prior buyer has paid the price, the buyer's value must have been higher). Sellers generally want to maximize their profit, or the welfare of buyers without making a loss, or some combination thereof, which are functions of the sales price and the number of goods sold. The seller may adjust the price over time to obtain a better idea of what buyers are willing to pay and how much surplus buyers are making, but this process can be time consuming and expensive for the seller. Frequent manipulation of pricing can also be problematic, since it can annoy buyers. If the price is set too high then buyers may go elsewhere, and may not return to the seller even if the seller later lowers the price.

For purposes of the embodiments described herein, a buyer is described by a point in value space at a particular time, where each axis corresponds to the valuation for one alternative item. For example, where two different items are being sold, each item has its own value axis and the value space is two dimensional. A seller's belief about buyers can be considered as a probability density over the value space. The seller's objective is to divide the value space into regions that are served by different contracts. These regions are known as (market) segments.

A lottery generally involves a distribution of tokens, such as tickets or virtual tokens, for a given price, with the understanding that one or more of the tokens, drawn randomly from the set of tokens, entitles the holder to a given item or group of items. Lotteries have been widely used as a game of chance in which the ticket holder gains satisfaction from the remote possibility of winning a large prize, even though the probability of winning generally does not warrant the cost of the ticket.

Lotteries have not been widely used for selling goods and services, however, where the item is traditionally sold for a fixed price. Moreover, it has been shown that in the case of lotteries for a single item, fixed price sales are generally equally effective. This is because when buyer valuations are one-dimensional, a seller that knows the probability density of buyer valuations would never find it better to provide contracts that involve a lottery. It was widely-believed until recently that this was also the case for multidimensional valuations, where a buyer is placing a valuation on two or more items. However, more recently, it has been proposed that lotteries do form part of the optimal mechanism for multidimensional valuations (see, Thanassoulis, J., Haggling over substitutes. *J. Economic Theory*, 117:217-245 (2004)).

Optimal multidimensional mechanisms have been characterized in detail via a function that describes a buyer's utility when they purchase the best possible contract for themselves. This function is known as the mechanism function (see, Manelli, A., Vincent D., Multidimensional mechanism design: Revenue maximization and the multiple-good monopoly. *J. Economic Theory*, 137:153-185 (2007)). Briest, et al. investigated the profit from an optimal lottery relative to the profit from an optimal non-lottery pricing scheme. They showed that the gain is three in two dimensions, unbounded in four and higher dimensions (Briest, P., Chawla, S., Kleinberg, R., Weinberg, S., Pricing Randomized Allocations. Proc. 21st Annual ACM-SIAM Symp. on Discrete Algorithms, Ed., Moses Charikar (January 2010)). Surprisingly, optimal lotteries may be found efficiently using linear programming or semi-definite programming. Effective methods for solving such problems are discussed by Aguilera and Morin (Aguilera, N., Morin, P., On convex functions and the finite element method. SIAM Journal on Numerical Analysis 47(4):3139-3157, (2009)).

One problem with lotteries is that the value that a buyer places on a lottery is not only influenced by the valuations that the buyer places on the items, but also by the extent to which the buyer is risk averse. Thus, lotteries may not perform optimally according to the predictions of classical economics.

INCORPORATION BY REFERENCE

The following reference, the disclosures of which is incorporated herein by reference in its entirety, is mentioned:

U.S. application Ser. No. 12/695,757, filed Jan. 28, 2010, entitled TRUTH SIGNALS, by Christopher R. Dance, Onno Zoeter, Yu An Sun, and Venkatesh Guru Rao, a method and apparatus for paying for an existing report. The method includes receiving an existing report for which a first structure of entities is identified. Thereafter, a set of other reports are received for which respective second structures of entities are identified. A weighting is selected for other reports in the set of other reports based on the respective structures. A payment for the existing report is extracted, based on the weighting, a selected scoring rule, and the set of other reports. One or more of the weighting selection and payment extraction may be performed by a computer processor.

BRIEF DESCRIPTION

In accordance with one aspect of the exemplary embodiment, a method of conducting a lottery for at least one item includes, for a plurality of buyers, receiving a buyer's declared valuation for each of at least one item being offered in a lottery by a seller, the item having an assigned non-deterministic probability of being allocated to the buyer, and providing insured prices for outcomes of the lottery which are a function of the buyer's declared valuation of the at least one item. The method further includes randomly drawing an allocation of each of the at least one item to a respective one of the buyers, based on its assigned non-deterministic probability and allocating the insured prices to the buyers based on respective outcomes of the random drawing.

In accordance with another aspect of the exemplary embodiment, a system for conducting a lottery for at least one item includes memory which stores instructions which, for a plurality of buyers, receive a buyer's declared valuation for each of at least one item being offered in a lottery by a seller, the item having an assigned non-deterministic probability of being allocated to the buyer and provide insured prices for outcomes of the lottery which are a function of the buyer's declared valuation of the at least one item, randomly draw an allocation of each of the at least one item to a respective one of the buyers, based on its assigned non-deterministic probability, and allocate the insured prices to the buyers based on respective outcomes of the random drawing. A processor in communication with the memory executes the instructions.

In another aspect, a combination of a lottery menu and insured prices is provided. The lottery menu identifies a set of lottery options, each lottery option comprising at least one item offered by a seller and a non-deterministic probability of a buyer being allocated each of the at least one item. The insured prices, for each of a set of possible outcomes in a lottery (the outcomes including an outcome in which the buyer receives the at least one item and an outcome in which the buyer is not allocated the at least one item), being based on a buyer's declared valuation for each of the at least one item, the non-deterministic probability of the buyer being allocated each of the at least one item, and an average price set for the at least one item.

DETAILED DESCRIPTION

Aspects of the exemplary embodiment relate to a system and method for conducting a lottery in which buyers of tokens are offered a limited lottery insurance which reduces the effect of risk aversion on buyers' selection between lotteries, between a lottery and non-participation or between a non-deterministic lottery and a deterministic consideration. While lottery insurance has been offered to sellers to compensate them in the event that too few buyers will participate (and thus the item offered is sold at a loss to the buyer), the use of insurance to neutralize buyer's risk aversion has not been considered.

Aspects of the exemplary system and method may address two problems which arise in lotteries:

1. Many buyers are risk-averse. Risk aversion may be defined is the reluctance of a person to accept an offer with an uncertain payout rather than another offer with a more certain, but possibly lower, expected payout. As a result, they do not wish to participate in a lottery or alternatively, they may choose from the available menu of lotteries as if their values for the outcomes were lower.

2. Buyers may make repeat purchases. Consider, for example, the case where a buyer can buy a lottery token for a TV at price of $10 and with a probability of being awarded the TV=0.1 or pay a price of $1000 with probability of receiving the TV=1. Given the opportunity to play multiple times, a buyer who values the TV at $1500 would prefer to play the low-price lottery until they win. In that way, they stand to gain $1500−10/0.1=1400, whereas for a price of $1000 they stand to gain only $1500−1000=$500. Both effects can result in significant loss of profit or welfare relative to an optimal operation.

The exemplary embodiment finds application in both one-dimensional and multidimensional lotteries. A one dimensional lottery is a lottery in which only one type of item is offered. Although there may be more than one of the same type of item, each token gives the buyer a probability of winning the item. A multidimensional lottery is a lottery in which two or more different items are being offered and each token gives the buyer a probability of winning each item. As noted above, one-dimensional lotteries have not been found effective for selling items. However, above-mentioned copending application Ser. No. 12/792,028 filed Jun. 2, 2010, entitled LEARNING OPTIMAL PRICES, by Christopher R. Dance and Onno Zoeter describes an application of one-dimensional and multi-dimensional lotteries for establishing buyer values for goods to be subsequently sold by normal selling methods without a lottery. In the case of multidimensional lotteries, where the lottery form of selling can be more effective than conventional selling methods, the exemplary embodiment can be used to facilitate such lotteries.

In one embodiment, a method of selling involves a combination of a lottery and offering limited lottery insurance to the buyers of tokens. In various aspects, a menu of lotteries is designed. The limited lottery insurance may allow buyers to choose between a set of insured prices to be paid, depending on the outcome of their chosen lottery. In some aspects, a time limit is established. This limits buyers who have purchased tokens for certain non-deterministic lotteries from making purchases of tokens of certain other non-deterministic lotteries within a specified time window.

Some advantages of aspects of the exemplary embodiment include:

1) enabling the practical application of multi-dimensional mechanism designs which can produce arbitrarily more profit or welfare than conventional mechanisms;

2) enabling the practical application of learning-by-lottery-this technique learns about the distribution of buyers' values arbitrarily faster than conventional price experimentation; and 3) enabling risk aversion to provide an additional incentive for buyers to indicate their true valuations, rather than an incentive to indicate untrue valuations;

Items, as used herein refer to goods, services, contracts, offers for procurements by the seller (i.e., negative transfers, where the seller pays the price), and combinations thereof, which are typically to be transferred between a seller and a buyer. When reference is made to distinct items, they may relate to a single physical object, but with different conditions associated with its use, such as rental for one month versus rental for two months.

Tokens, as used herein generally refer to a contractual agreement between the buyer and the seller that the results of the lottery will be drawn according to the assigned probabilities and the buyer and seller will make payments as specified by the outcomes.

In a lottery, a buyer is given the option to pay a price for a lottery token for which there is a probability that he will be allocated at least one item from the set of at least one items offered in the lottery. In the exemplary embodiment, one or more of the items in the lottery is non-deterministic, i.e., is provided with probability equal to neither 0 nor to 1 (the buyer has a probability that he will receive the item, but is not certain of doing so). One or more items in the lottery can be deterministic, i.e., they are provided with probability 0 or 1 (if the buyer pays a set price, he is guaranteed to receive the item, otherwise, he will not).

The word "buyer" is used herein to describe a person or other entity which is given the opportunity to participate in a lottery, whether he chooses to do so or not. The word "seller" is used herein to describe a person or other entity which offers one or more items a lottery.

"Prices," which refer herein to price plans, schemes, menus, contracts, and other prices associated with lottery items are typically a (randomized) function(s) of (beliefs over distributions of):

a) volume; competitors' prices;
b) an ensemble of essentially simultaneous bids;
c) time or purchase history; available inventory or capacity;
d) customization or personalization of the combination of items (good, service or contract);
e) group (segment or category) of people or specific person e.g. place, business-vs.-consumer; and production costs, switching costs, risk aversion and network effects.

The word "random" is intended to incorporate pseudo-random methods of allocating item(s) to a buyer or buyers from a set of participating buyers, where the method is not entirely random, but which through a process involving chance, results in the identification of a buyer which is not known to the buyers or seller in advance of a random drawing. Also, as an alternative to a computer-generated random allocation, for example, the winning buyer(s) may be randomly selected in other known ways, e.g., by drawing tickets from the collection of tickets, use of scratch-off or peel-off lottery tickets, or by other known methods, such as with a commercially-available random number generator.

Figure 1:
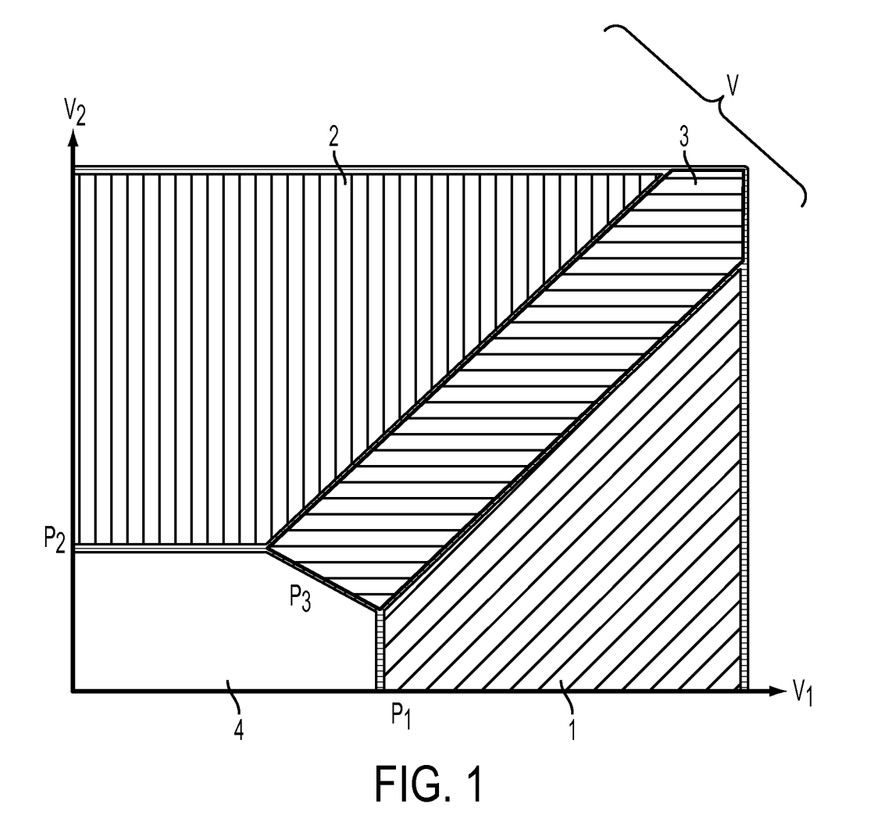
FIG. 1 is a schematic view of a valuation space segmented into regions corresponding to different buyer values of two items.

By way of example, FIG. 1 illustrates an optimal mechanism for selling one of two items given a known distribution of buyer valuations. The mechanism assumes that each item has a cost to the seller, which is known to the seller and not the buyer, and a value for each buyer (which is normally known to the buyers but not the seller). A value space V of the buyer is delimited by the axes $v_1$ and $v_2$. $v_1$ is the buyer's value for item 1 and $v_2$ is the buyer's value for item 2. As will be appreciated, buyers place different values on each of the two items. The value space is segmented into a plurality of regions 1-4. Buyers in Region 1 are willing to buy item 1 for price $p_1$ because their value on item 1 is at least $p_1$. Buyers in the Region 2 are willing to buy item 2 for price $P_2$ because the value they place on item 2 is at least $p_2$. Buyers in Region 3 are willing to buy a lottery token which gives either item 1 or item 2, with some probability, for a price $p_3$. Region 4 corresponds to buyers who are not willing to pay any one of $p_1$, $p_2$, and $p_3$.

The seller would like to obtain such information in order to set prices $p_1$ and $p_2$, or $p_3$. In the exemplary embodiment, the buyers' stated values in the valuation space influence the insured prices offered to the buyer. As explained below, the insured prices correspond to prices which the buyer will pay or receive, depending on the outcome of the lottery, which are designed to offset, at least in part, the buyer's risk aversion, while ensuring that the seller receives an expected price for the item, after factoring in the payments made to the buyers.

Figure 2:
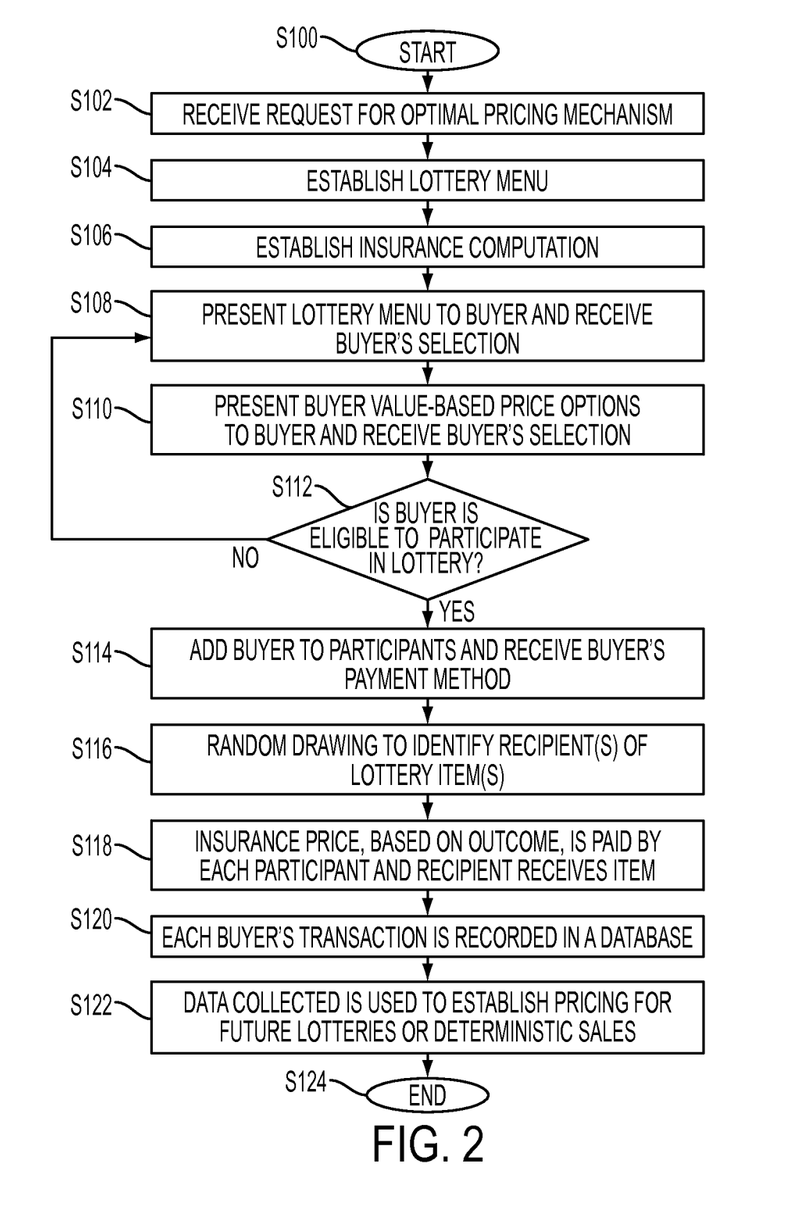
FIG. 2 illustrates an exemplary method of conducting a sale as a lottery in accordance with one aspect of the exemplary embodiment.

FIG. 2 is a flow chart which illustrates an exemplary method of conducting a lottery in accordance with one aspect of the exemplary embodiment. Briefly, the buyer indicates value information that is sufficient to set insured prices for a lottery that is consistent with any time limits remaining from his recent purchases, a random outcome is selected corresponding to the lottery and a corresponding item (if any) is allocated at some stage, and a total amount corresponding to the insurance-based prices for the outcome is paid by the buyers.

The method begins at S100.

At S102, a request is received from a seller wishing to sell some items. The items may be any good(s) or service(s). The items may be provided or received. The provision or reception may be over any set of future times, in any quantity or quantities. The exemplary embodiment focuses on the case of provision by the seller. The case of procurement by the seller can be addressed by considering negative item quantities.

At 3104, a set of lottery options for a lottery is established, e.g., in the form of a menu of lottery options. The menu may be designed by the seller or by a menu provider in cooperation with the seller.

At S106, a pricing mechanism for each of the non-deterministic lottery options is established, which is a function of a buyer's value placed on the items being offered in the lottery option and the outcome of the lottery for the buyer. The pricing mechanism is designed to reduce or eliminate the effect of the buyer's risk aversion.

At S108, the menu of lottery options, each option corresponding to a different offer, is presented to a prospective buyer. The buyer may choose a lottery option from the menu of lottery options that was presented, or may decide not to participate.

At S110, if the buyer has selected a non-deterministic lottery option, the buyer is presented with a range of insurance-based prices for the outcomes of the selected lottery option which are a function of the buyer's value placed on the items offered in the option, computed according to the pricing mechanism.

At S112, optionally, a determination is made as to whether the buyer is eligible to participate in the lottery, at least as far as the non-deterministic options are concerned. For, example, the buyer may be requested to present a unique identification (ID) and the ID is compared against past sales. If not, the method returns to S108. If the buyer is determined to be eligible, the method proceeds to S114, where the buyer is added to the list of participants.

At S116, once a satisfactory number of participants is reached (which does not affect the probabilities), a random allocation of the non-deterministic items is drawn according to the lottery probabilities. One or more of the buyers is thus a recipient of one or more of the items offered in the lottery.

At S118, the agreed insured price is paid by all buyers, including the recipient, and the recipient receives the item. To ensure payments are made, the buyer may be required, at S114, to provide a payment method, such as a credit card, from which the payment will be automatically deducted (or credited in the case of a negative payment).

At S120, the seller records the buyer's transaction in a database.

At S122, the data collected may be used in establishing prices for future lotteries and/or deterministic sales.

The method ends at S124.

As will be appreciated, the method may include fewer, more, or different steps and the steps need not all take place in the order illustrated.

Figure 3:
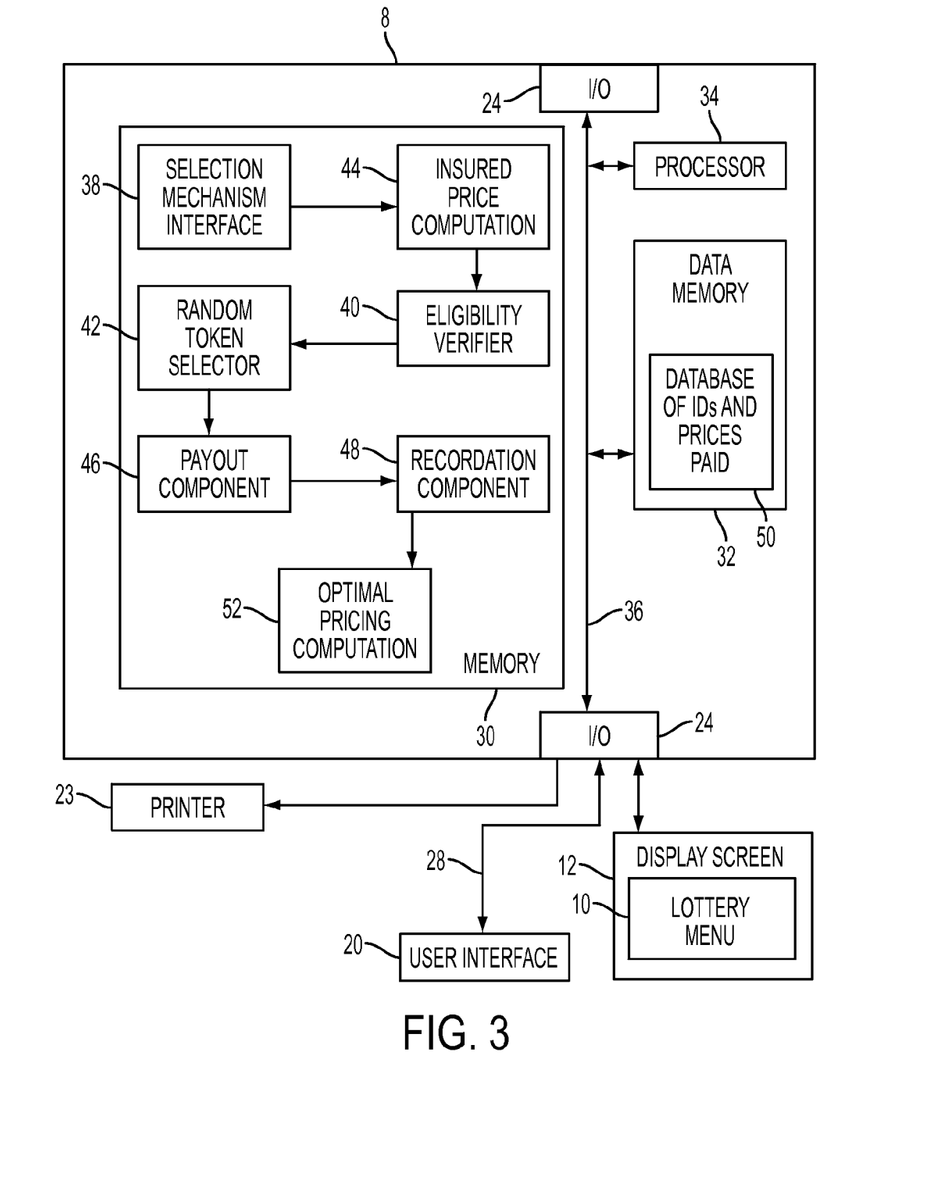
FIG. 3 illustrates a system for performing the method of FIG. 2.
Figure 4:
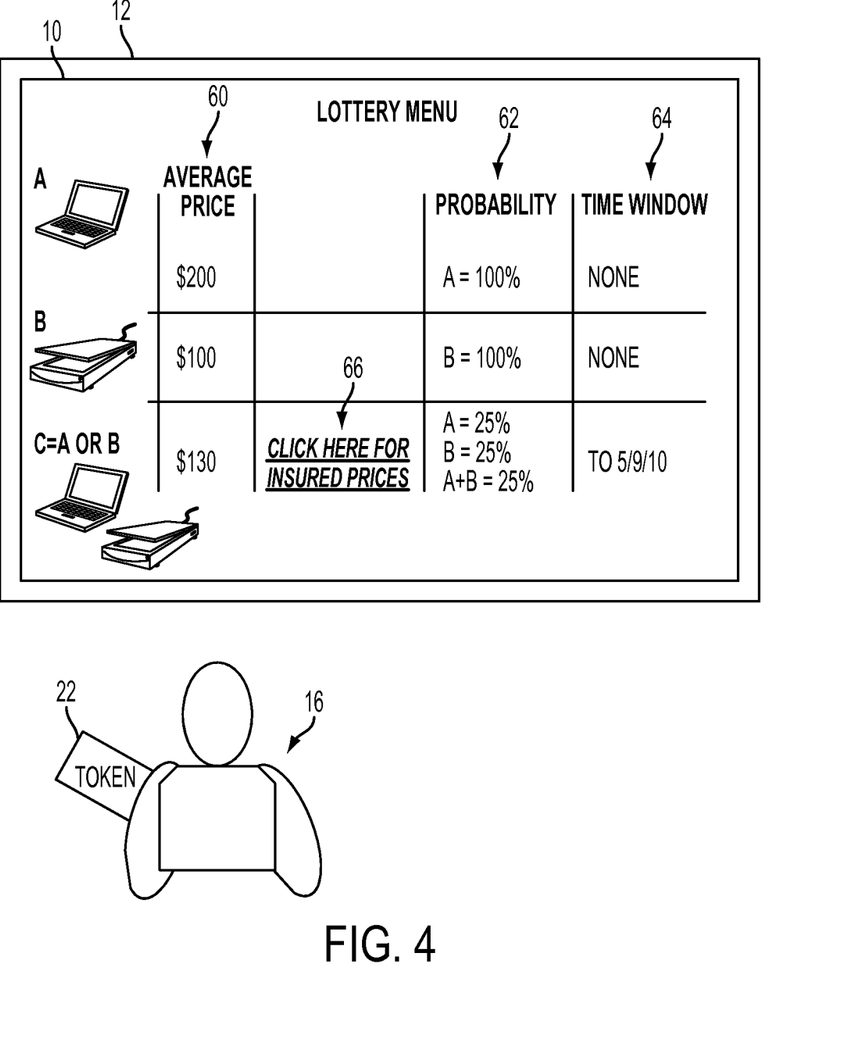
FIG. 4 illustrates a screenshot of a graphical user interface displaying an exemplary lottery menu.

FIG. 3 illustrates an exemplary system 8 suited for performing the illustrated method. FIG. 4 illustrates an example lottery menu 10 which is presented by the system. The lottery menu 10 shows the options for the lottery. The lottery menu may be a tangible object, such as a sheet on which the menu options are printed, or may be displayed to a buyer 16, for example, on a display screen 12 associated with a computing device 14.

Figure 5:
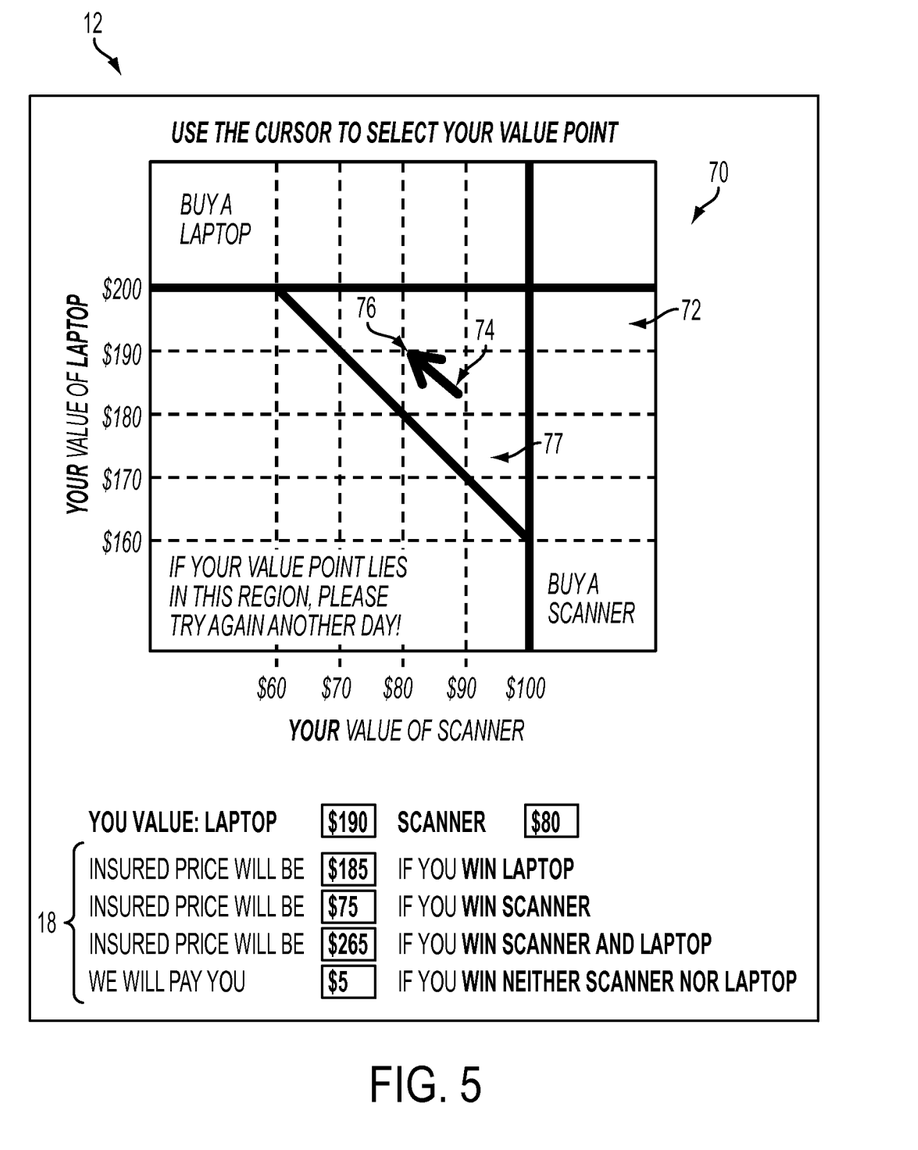
FIG. 5 illustrates another screenshot of the graphical user interface displaying a pricing selection mechanism in accordance with one aspect of the exemplary embodiment.
Figure 6:
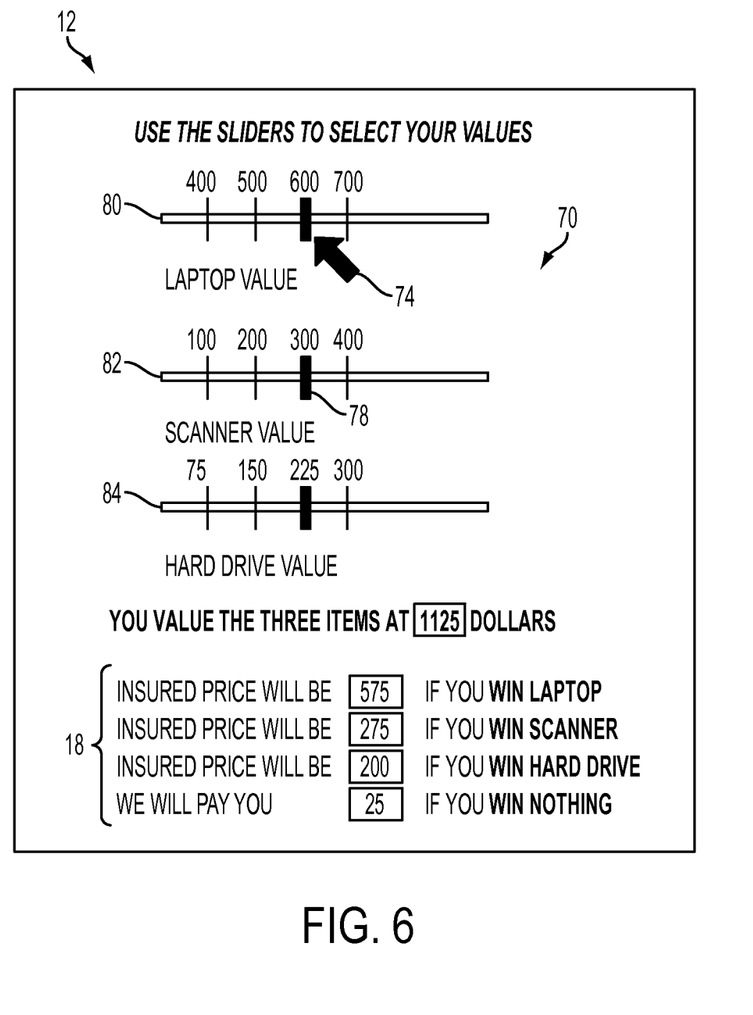
FIG. 6 illustrates another screenshot of the graphical user interface displaying a pricing selection mechanism in accordance with another aspect of the exemplary embodiment.

Insured prices 18 are also presented to the buyer (see, e.g., FIGS. 5 and 6). As for the lottery menu, the insured prices 18 may be in the form of a tangible object, such as a sheet on which a range of prices are printed, or may be displayed to the buyer, for example, on the display screen 12, or presented aurally, e.g., via speakers associated with the display 12.

A selection mechanism is provided to the buyer. In one embodiment, the selection mechanism is provided via a graphical user interface (GUI) which includes user interface 20 and/or display screen 12, through which the user selects from the lottery menu, and insured prices 18. The buyer may also use the GUI to enter his ID, provides a method of payment, e.g., credit card details. A lottery token 22 may also be viewed via the GUI and printed as a record (FIG. 4) on an associated printer 23. The user interface 20 may include a keypad, keyboard, touch screen, cursor control device, or combination thereof. In other embodiments, the buyer may purchase a tangible token, such as a lottery ticket, on which his lottery option selection and insured price may both be printed.

The GUI is in communication with an input/output connection 24 of a computing device or devices 26 via a wired or wireless link 28, such as a cable, telephone connection, local area network, or wide area network, such as the Internet.

The exemplary computer includes main memory 30 which stores instructions for performing the exemplary method, data memory 32, and a processor 34 for executing the instructions, all connected via a data/control bus 36.

The exemplary computer 14 may be include one or more of a general purpose computer and a dedicated computing device, such as the buyer's laptop or desktop computer, portable digital assistant (PDA), server computer, cellular telephone, cash register or lottery ticket dispenser with computing capability, or other computing device capable of executing instructions for performing the exemplary method. In some embodiments, the computers 14 may include a client computer and a server computer, which each host some of the software for performing the exemplary method.

In the exemplary embodiment, the system includes various software components for performing the exemplary method, including a selection mechanism interface 38, which receives the buyer's selections and stores them in data memory 32, an eligibility verifier 40, which determines whether the buyer is eligible to participate in the selected lottery option, a random token selector 42, which identifies one or more of the participants as recipients of the items offered, an insured price computation component 44, which computes the insured prices for the buyer's lottery option item(s) based on the buyer's selected valuations, and various outcomes, a payout component 46, which makes payments to the seller/buyers, depending on the outcomes and insured prices, a recording component 48 which records the buyer's ID and prices paid for items in a database 50, and optionally an optimal pricing computation component 52, which provides optimal pricing information to the seller, based on a set of lotteries conducted by the buyer, as described in further detail below.

In the exemplary embodiment, the database 50 is stored in memory 32. Alternatively, it may be resident on a remote server computer (not shown).

The memory 30, 32 may be separate or combined and may represent any type of tangible computer readable medium such as random access memory (RAM), read only memory (ROM), magnetic disk or tape, optical disk, flash memory, or holographic memory. In one embodiment, the memory 30, 32 comprises a combination of random access memory and read only memory. In some embodiments, the processor 34 and memory 30 may be combined in a single chip. The interface 24 allows the computer to communicate with other devices via a computer network, such as a local area network (LAN) or wide area network (WAN), or the internet, and may comprise a modulator/demodulator (MODEM).

The digital processor 34 can be variously embodied, such as by a single-core processor, a dual-core processor (or more generally by a multiple-core processor), a digital processor and cooperating math coprocessor, a digital controller, or the like. The exemplary digital processor 34, in addition to controlling the operation of the computer 24, executes instructions stored in memory 30 for performing the method outlined in FIG. 2.

As will be appreciated, FIG. 1 is a high level functional block diagram of only a portion of the components which are incorporated into a computer system 24. Since the configuration and operation of programmable computers are well known, they will not be described further.

Further details of the method and system will now be described.

Lottery Menu 10

The lottery menu 10 may include a plurality of options, any one of which is selectable by a buyer 16 as a lottery token.

Each lottery option involves the assignment of one or more items for a seller selected, preset average price. The average price is the price the seller expects to receive, on average, from the buyers of that option.

At least one of the lottery options is non-deterministic, i.e., is provided with probability equal to neither 0 nor to 1. Other options may be deterministic, i.e., they are provided with probability 0 or 1 (more typically, a probability of 1, such that the buyer is assured of receiving the item for the preset price. For example, in FIG. 4, three options are shown, for A, B, and C, where C is an option for two different items, A and B (in the illustration, A is a computer and B is a scanner, although any number of items and any type(s) of item are contemplated). The average price 60 for a lottery token is set for each item or group of items. In the case of deterministic options, such as A and B, the average price is the price that all buyers pay. In the case of non-deterministic options, such as option C in FIG. 4, the average price is a probability based average price which the seller expects to receive from each buyer, based on the insured prices for each of the possible outcomes provided by the lottery, as further described below.

The probability 62 of the token being a winning token for each item is also displayed. In the case of option C, three probabilities are shown, one for A, one for B and one for both A and B. As will be appreciated, there is also a 25% probability of receiving nothing. The holder of such a token could thus be the recipient of the item A, B, A and B, or nothing. In other embodiments, the lottery may be set up to give A, B, or nothing, but not both of A and B. Additionally, while in this example, all probabilities are the same, in other embodiments, different probabilities may be assigned to each of the options, such as a 40% chance of A, a 50% chance of B, and a 10% chance of receiving nothing.

A time window 64 for the offer may also be shown for some of the offers. Once the buyer has decided on a non-deterministic lottery option that he is interested in, clicking on an icon 66 or other actuable area of the screen directs the buyer to another screen, where insured prices are determined and presented, as discussed below with reference to FIGS. 5 and 6.

Each non-deterministic lottery option (C in the example) is associated with a region of a value space, which may be analogous to that shown in FIG. 1. Each axis of the value space corresponds to a specific item, thus, for n items the value space is n-dimensional. The position along the respective axis indicates the maximum that a buyer would pay for that item, relative to any outside option(s).

A lottery option involving at least one non-deterministic item may be associated with a time window 64, which is the set of times over which any of the items in the lottery is considered as useful. For instance, when selling a one-month subscription starting today, the time window would be one month starting today.

The lottery menu 10 may contain a discrete set of lottery options (as shown in FIG. 4), a continuum of lottery options, or some combination thereof. A continuum of lottery options is a variable lottery. It corresponds to any relationship from a dense set of prices to outcome probabilities for which the outcome probabilities are not piecewise constant. For example, the seller may establish an average price p for a probability $z_i = f(p)$ where function $f$ is continuous and not a constant.

Presenting the Lottery Menu (S108)

The lottery menu 10 may be presented to the buyer in a variety of ways, such as:

i) a textual list of probabilities and prices;
   ii) a graphical display of probability against price;
   iii) an interface 20, 12 where the buyer queries the computer system 14 for probabilities and prices associated with particular purchase alternatives;
   iv) some combination of (i)-(iii).

Here the prices are average prices. The actual price paid by the buyer is outcome dependent, as described in greater detail below.

Determination of Eligibility (S112)

This step is to determine whether the buyer has already made a purchase of a token for a particular non-deterministic lottery option, to limit the buyer to purchasing a single token for any non-deterministic lottery option. In one embodiment, the buyer provides identity information. This may be a credit card, identity card, drivers license, passport, social security, biometric (e.g., fingerprint or eye scan), password, or other well-known identity-fraud-resistant information.

Using the ID information, the seller searches for the buyer in the database 30 of past sales of non-deterministic items.

Let the set of non-deterministic items purchased by this buyer in any lotteries for which the time window 64 has not yet elapsed be S. If the buyer's selected lottery option involves any non-deterministic items in S, the buyer is prevented from making a purchase. This is the case for example, if the buyer has purchased a lottery token for option A in FIG. 3 and then requests a lottery token for option C (or vice versa). Since C includes A, this purchase is not allowed. If, however, he had previously purchased a lottery token for option B, before its time window 64 expired, the buyer would not be prevented from purchasing a lottery token for C between May 10 and May 20, 2010.

Insured Prices

In the exemplary embodiment, at 5110, the buyer selects from a range of insured prices for each of the lottery outcomes. For each outcome, an insured price is determined, based on the buyer's valuation of the items in the lottery option. The insured price is the price the buyer will pay to the seller (or if negative, will receive from the seller) if that outcome occurs. For example, for option C in FIG. 4, there are four possible outcomes: 1) the buyer wins nothing; 2) the buyer wins both items A and B; 3) the buyer wins item A; and 4) the buyer wins item B. Each of these outcomes has an insured price which is a function of the buyer's valuation of the items A and B.

For example, say a buyer values an item such as a television at $150 and buys a lottery token with a price $10 and probability of winning of 0.1. Without insurance, 90% of the time, the buyer loses $10. A buyer who is risk averse would tend not to buy the lottery token. With insurance, however, rather than paying a fixed price for a lottery token, the buyer may receive $5 from the seller if he does not get the TV. However, the buyer must pay $145 to the seller if he wins the TV. In each case, the buyer makes a surplus of $5. The average return to the seller is the same with or without insurance. Yet, there is no risk to the buyer with insurance. This step is described in more detail below.

The insured prices may be limited so that:

a) They correspond to valuations within the region of value space associated with the lottery, as described above. As with the presentation of the menu of lotteries, the insurance prices can be presented and hence limited, either by: a textual list of prices; by a graphical display where the user drags a point in a region and a corresponding set of insurance prices is shown; a graphical display where a user drags sliders and a corresponding set of insurance prices is shown; or by a user entering numbers corresponding to valuations for outcomes and either being shown the corresponding insurance prices, or being informed that no such insurance prices are available for the given lottery and that a different lottery may be more suitable. Alternatively, the parameters of a formula corresponding to the feasible set of insurance prices are provided to an automated purchasing agent and when the purchasing agent selects insurance prices using this formula, the feasibility of the corresponding selection is checked.

b) The average insured price (weighted with respect to the probabilities of the lottery outcomes) equals or approximately equals the average lottery price.

The selection of insured prices may proceed as follows. A buyer declares valuations $v_i$ for items i=1, 2, . . . n that correspond to some region R of a value space (e.g., R corresponds to one of regions 1, 2 and 3 of value space V in FIG. 1). This region corresponds to a lottery that allocates item i with probability $z_i$ for an average (mean) price p. The insured price $p_i$ for each of the items may be based on the average price p for the item i, the probability $z_i$ of winning the item i, the buyer's valuation $v_i$ for item i, and the corresponding probabilities $z_j$ and buyer valuations $v_j$ for the items other than i in the lottery option. For example, if the insurance price to be paid by the buyer to the seller for outcome i is $p_i$ where there are n+1 possible outcomes and where outcome n+1 is an outcome where the buyer receives no item, then the insured prices $p_i$ may be set according to a formula:

$$p_i := p + v_i - \sum_{j=1}^{n+1} z_j v_j. \quad (1)$$

where $v_{n+1}=0$, $z_{n+1}=1-\sum_{i=1}^{n} z_i$ is used to model a lottery option with the possibility that nothing is assigned to the buyer. Insured price $p_{n+1}$ corresponds to the price paid when the buyer is allocated no item. Frequently, this price is negative, corresponding to an amount to be paid to the buyer.

The average price p corresponds to the sum, over all items, of the insured price multiplied by its probability:

$$p = \sum_{i=1}^{n+1} z_i p_i. \quad (2)$$

In some aspects, an insurance limit is established. This has the effect of limiting buyers' choices of insured prices to those insured prices associated with the region of the value space for their selected lottery, as described in further detail below. For instance, if the insurance price to be paid by the buyer to the seller for outcome i is $p_i$ where there are n+1 possible outcomes and where outcome n+1 is an outcome where the buyer receives no item, then as described below, the insurance prices may be set according to a formula:

$$p_i = p + v_i - \sum_{j=1}^{n+1} z_j v_j$$

where $v_i$ is the buyer's value for item i, $z_j$ is the probability that item j is allocated and p is the average (mean) amount that a buyer of the lottery pays.

In one embodiment, the buyer's declared valuations are constrained to valuations within preset limits. In this embodiment, the region of the full value space V corresponding to the selected lottery is M⊂V, i.e., the buyer is constrained to select values for each of the items which fall within set M, then the insured prices may be limited to the set of $p_i$ for which there is a valuation vector v with components $v_i$ that is in set M. That is the insurance price vectors p are limited to the set:

$$P_M := \{p : \exists v \in M, \text{ such that } p = 1(p - \sum_{j=1}^{n+1} z_j v_j) + v\}$$

where 1 is the n+1 dimensional vector whose components are all equal to one.

Various methods for receiving the buyer's declared valuations of the items and displaying the insured prices based on them are contemplated. For example, FIG. 5 is an example screenshot of the display 12 during receipt of the buyer's valuations for the items shown in buyer-selected non-deterministic option C in FIG. 4. The screen displays a valuation section mechanism 70 which includes a value space 72 in which the user is asked to move the cursor 74 to a point corresponding to the buyer's valuation of items A and B. For example, the buyer may select a price point 76 set his valuation $v_{laptop}$ of the laptop at $190 and his valuation $v_{scanner}$ at $80. The screen displays the insured price 18 at the selected price point 76 for each outcome (i.e., corresponding to the amount which will be paid to the buyer if he wins none of the items and what he will pay if he receives one or both of the items).

As an example, in the embodiment of FIG. 5, a buyer may set his valuation $v_{laptop}$ of the laptop at $190 and his valuation $v_{scanner}$ of the scanner at $80. The probability of winning the laptop, winning the scanner or winning both the laptop and the scanner are all equal to ¼ in this simplified example. The mean price for the lottery is thus $130. The system thus computes insurance prices $p_i$:

$$p_{laptop} = 130 + 190 - \frac{1}{4}(190 + 80 + (190 + 80)) = \$185$$

$$p_{scanner} = 130 + 80 - \frac{1}{4}(190 + 80 + (190 + 80)) = \$75$$

-continued $$p_{both} = 130 + 80 + 190 - \frac{1}{4}(190 + 80 + (190 + 80)) = \$265$$

$$p_{none} = 130 + 0 - \frac{1}{4}(190 + 80 + (190 + 80)) = -\$5.$$

In the valuation space shown in FIG. 5, lottery insurance is only provided when buyers declare valuations within the triangular region 77 which has a right angle at scanner value $100 and laptop value $200 corresponding to the maximum buyer values permitted. It may be the case, however, that the region corresponding to risk-neutral buyers who would prefer to purchase the lottery actually extends above and to the right of triangular region 77. Thus, in this example, the lottery insurance has been deliberately limited to a subset of the market segment that may be identified by mechanism design theory or intuitively by the seller. The insured price space 77 may have other shapes than triangular and can, of course, have more than two dimensions in the case of more than two items.

Sellers may find such constraints on buyer valuations beneficial for several reasons. Firstly, if a buyer has valuations of $v_{laptop}$=$220, $v_{scanner}$=$120, then the buyer could rationally prefer the lottery option, yet their insurance price for the outcome in which they receive nothing would be:

$$p_{none} = 130 + 0 - \frac{1}{4}(220 + 120 + (220 + 120)) = -\$40.$$

As sellers may also be risk averse, this amount may be too large for some sellers. Clearly, for appropriate choices of menus of lotteries, it is possible that a seller who does not additionally limit insurance prices in this way might face arbitrarily large payouts to some buyers. A second reason for placing this limit on the lottery is that a seller may make a loss from selling to risk-neutral buyers whose valuations lie outside this triangle 77 and who would rationally prefer the lottery, relative to what that seller could obtain from those buyers if they were to select deterministic options. For instance, given the buyer with valuations $v_{laptop}$=$220, $v_{scanner}$=$120, the seller would expect to make only $130 by selling the lottery option, yet could make $100+$200=$300 if the buyer were to purchase the two deterministic options. By limiting the range of insurance prices to those corresponding to valuations from triangular region 77, the most favorable insurance prices this buyer could take would be those by stating that their valuations are $v_{laptop}$=$200, $v_{scanner}$=$100. These constrained valuations would give insurance prices of:

$$p_{laptop} = 130 + 200 - \frac{1}{4}(200 + 100 + (200 + 100)) = \$180$$

$$p_{scanner} = 130 + 100 - \frac{1}{4}(200 + 100 + (200 + 100)) = \$80$$

$$p_{both} = 130 + 80 + 190 - \frac{1}{4}(200 + 100 + (200 + 100)) = \$280$$

$$p_{none} = 130 + 0 - \frac{1}{4}(200 + 100 + (200 + 100)) = -\$20.$$

For these constrained valuations, the buyer then stands a 25% chance of making a surplus of only $20 from the purchase of the lottery, rather than a 100% certainty of having a surplus of $120+220−300=$40 from the purchase of the deterministic options. Most buyers would be too risk averse to then accept the lottery option, particularly if the choice is framed in this way. For these buyers, selecting the deterministic lottery A and/or B would be the more rational choice.

As will be appreciated, FIG. 5 illustrates only one embodiment of a selection mechanism 70. In other selection mechanisms, the buyer's valuations $v_i$ may be approximate. For example, the buyer 16 may be asked to select approximate valuations from a set of discrete valuations for each item, such as from the value set: $160, $170, $180, $190, and $200 for the laptop A and from the value set: $60, $70, $80, $90, and $100 for the scanner B. In other cases, the buyer may be permitted to select from a continuous or virtually continuous scale of valuations, such as every dollar value from $160 to $200 in the case of laptop A.

FIG. 6 shows another embodiment of a selection mechanism 70, suited to use where there are more than two items in the lottery option. The buyer uses the cursor 74 to move a slider 78 along a valuation bar 80, 82, 84 for each of the items in the lottery option. The screen displays the insured price 18 at the selected price point 76 corresponding to the amount which will be paid to the buyer if he wins none of the items and what he will pay if he receives one of the items.

In other embodiments, the buyer may be presented with a matrix of valuations or a set of valuations for each item and asked to select the vales which best fit the buyer's actual valuations.

The insured prices 18, when computed according to Eqn. (1) make all risk-averse buyers risk-neutral, yet they can be shown to result in average price p for the seller, as follows:

If a buyer chooses a lottery option with probabilities $z_i$ (consider that $v_{n+1}=0$, $z_{n+1}=1-\Sigma_{i=1}^{n}z_i$ to model a lottery option with the possibility that nothing is assigned to the buyer) and price p, then they would have a utility of:

$$\sum_{i=1}^{n+1} z_i C(v_i - p)$$

for the lottery if their risk aversion is characterized by some monotonically-increasing concave function $C(\cdot)$. If instead, depending on the outcome of the lottery, they were charged a price:

$$p_i := p + v_i - \sum_{j=1}^{n+1} z_j v_j$$

they would have a utility of:

$$\sum_{i=1}^{n+1} z_i C\left(v_i - p - v_i + \sum_{j=1}^{n+1} z_j v_j\right) = C\left(-p + \sum_{j=1}^{n+1} z_j v_j\right)$$

and a seller would still expect to receive the average price:

$$\sum_{i=1}^{n+1} z_i p_i = p.$$

Buyers would then compare lotteries L, L' on the basis of $$C\left(-p^L + \sum_{j=1}^{n+1} z_j^L v_j\right) \geq C\left(-p^{L'} + \sum_{j=1}^{n+1} z_j^{L'} v_j\right).$$

Since function $C(\cdot)$ is monotonically increasing, this is equivalent to comparing:

$$-p^L + \sum_{j=1}^{n+1} z_j^L v_j \geq -p^{L'} + \sum_{j=1}^{n+1} z_j^{L'} v_j$$

which is what a risk-neutral buyer would do.

Understanding the notion of incentive compatibility and mechanism design, it can be seen that the buyer's utility:

$$\sum_{i=1}^{n+1} z_i C\left(v_i - p - v_i' + \sum_{j=1}^{n+1} z_j v_j'\right)$$

for declaring some valuations $v'_i$ is in fact maximized by reporting $v'_i = v_i$. Indeed, if the function C is strictly monotonic, the report $v'_i = v_i$ is the only maximum. Thus, it is strictly incentive-compatible for a buyer to report their true valuation even within a single non-deterministic segment of a piecewise linear mechanism function, whereas risk-neutral buyers only find it strictly incentive compatible to report their valuation to be within a given linear segment. Given a degree of risk aversion, the valuations revealed by a buyer's choice of insured prices can thus be trusted more than the valuations revealed by their choices in a non-lottery mechanism. This is useful for sellers wanting to learn about the distribution of buyers' valuations.

Another aspect of the same observation is the incentive-compatibility constraint in optimal mechanism design can be relaxed somewhat when faced with risk-averse buyers. Specifically, the mechanism function does not have to be convex, only "nearly" convex where the definition of "near" depends on the specific form of the function C. However, if the seller does not know the nature of the risk-aversion of the buyers, or the near-convexity constraint is computationally difficult, conventional risk-neutral mechanism design can be applied even in the risk-averse case.

Establishing Prices for Future Lotteries/Deterministic Sales (S122)

Above-mentioned copending application Ser. No. 12/792,028, entitled LEARNING OPTIMAL PRICES, by Christopher R. Dance and Onno Zoeter, discloses a method for determining prices for future sales, based on learning through lotteries. That application describes a system for learning optimal prices by making superpositions of economic mechanisms. These superpositions correspond to menus of lotteries. Such methods have the benefit of learning faster about the distribution of buyer valuations than it is possible to learn by posting a corresponding sequence of price-only mechanisms, while providing the same seller profit and buyer surplus as the sequence of price-only mechanisms. The data collected in the lotteries described herein may be used in such a method for establishing prices for future lotteries and/or deterministic sales, including the prices paid and the declared user valuations. Alternatively, the lotteries conducted in the method described in that application may be conducted with the insured prices described herein. Further, the methods used in that application may be used to establish the average prices for the lottery options herein.

The method illustrated in FIG. 2 may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method for conducting a lottery.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for conducting a lottery for at least one item comprising:
for each of a plurality of buyers:
receiving a buyer's declared valuation for each of at least one item being offered in a lottery by a seller, the item having an assigned non-deterministic probability of being allocated to the buyer; and
calculating, by a computer processor, insured prices for outcomes of the lottery which are a function of the buyer's declared valuation of the at least one item, the insured price $p_i$, for each item being based on an equation which incorporates:
an average price p for the respective item i,
the probability $z_i$, of being allocated the item i,
the buyer's declared valuation $v_i$, for the item i, and corresponding probabilities $z_j$ and the buyer's valuations $v_j$ for items other than i offered in the lottery;
randomly drawing an allocation of each of the at least one item to a respective one of the buyers, based on its assigned non-deterministic probability; and
allocating the insured prices to the buyers based on respective outcomes of the random drawing.

2. The method of claim 1, wherein the average price for the at least one item is established by the seller.

3. The method of claim 1, wherein the at least one item comprises a plurality of items.

4. The method of claim 1, wherein the insured prices for outcomes of the lottery are computed to render the buyer risk neutral with respect to the buyer's valuation of the at least one item.

5. The method of claim 1, wherein for each of the buyers, an average of the insured prices, weighted according to their probabilities, equals an average price for the at least one item, set by the seller.

6. The method of claim 1, wherein the insured prices result in a payment to at least some of the buyers who are not allocated the at least one item.

7. The method of claim 1, further comprising displaying a menu of the lottery options and receiving the buyer's selection of one of the lottery options, each lottery option comprising at least one item and an assigned probability, at least one of the options comprising an item having an assigned non-deterministic probability.

8. The method of claim 1, wherein the receiving the buyer's declared valuation comprises displaying a valuation space and receiving the buyer's selection of a valuation point corresponding to the buyer's valuation of at least one item within the valuation space.

9. The method of claim 8, wherein the valuation space places constraints on the buyer's declared valuations.

10. The method of claim 1, wherein the method further comprises determining the eligibility of the buyer to participate in the lottery based on past purchases of the buyer.

11. The method of claim 10, wherein the buyer is prevented from participating in a lottery for an item which has been allocated to the buyer by the seller in a time window which is unexpired.

12. The method of claim 1, wherein the receiving information from the buyer is performed by a computer processor.

13. The method of claim 1, further comprising, recording the buyer's transaction in a database.

14. The method of claim 1, further comprising computing an optimum price for the at least one item based on a plurality of lotteries.

15. A method for conducting a lottery for at least one item comprising:
for each of a plurality of buyers:
receiving a buyer's declared valuation for each of at least one item being offered in a lottery by a seller, the item having an assigned non-deterministic probability of being allocated to the buyer, and
calculating, by a computer processor, insured prices for outcomes of the lottery which are a function of the buyer's declared valuation of the at least one item;
randomly drawing an allocation of each of the at least one item to a respective one of the buyers, based on its assigned non-deterministic probability; and
allocating the insured prices to the buyers based on respective outcomes of the random drawing,
wherein there are n+1 possible outcomes and the insured prices for each of the buyers are set based on the following equation:

$$p_i := p + v_i - \sum_{j=1}^{n+1} z_j v_j,$$

where $p_i$ is the insured price of an item i=1, 2, ..., n;
$v_i$ is the buyer's declared valuation for item i;
p is an average price set by the seller for the item i;
$z_i$ is the probability of being allocated the item i;
$z_j$ is the probability of being allocated an item other than item i, and $v_j$ is the buyer's declared valuation for that other item; and $$v_{n+1} = 0, \quad z_{n+1} = 1 - \sum_{i=1}^{n} z_i$$

is used to model the possibility that nothing is allocated to the buyer.

16. A system for conducting a lottery for at least one item comprising:
   memory which stores instructions which, upon execution by a processor:
   for a plurality of buyers, receive a buyer's declared valuation for each of at least one item being offered in a lottery by a seller, the item having an assigned non-deterministic probability of being allocated to the buyer and calculate insured prices for different outcomes of the lottery, the insured price $p_i$, for each of the items being based on an equation which incorporates:
   the average price p for the respective item i,
   the probability $z_i$ of winning the item i, the buyer's declared valuation $v_i$ for the item i, and corresponding probabilities $z_j$ and the buyer's valuations $v_j$ for items other than i offered in the lottery,
   randomly draw an allocation of each of the at least one item to a respective one of the buyers, based on its assigned non-deterministic probability, and
   allocate the insured prices to the buyers based on respective outcomes of the random drawing; and
   the processor in communication with the memory for executing the instructions.

17. The system of claim 16, further comprising a graphical user interface for inputting the buyer's declared valuation for each of the at least one item and for displaying the insured prices.

18. A computer program product comprising a non-transitory computer-readable medium storing instructions which, when executed by a computer, perform a method comprising: for each of a plurality of buyers:
   receiving a buyer's declared valuation for each of at least one item being offered in a lottery by a seller, the item having an assigned non-deterministic probability of being allocated to the buyer; and
   calculating an insured price for each of a plurality of different outcomes of the lottery, each of the insured prices being a function of the buyer's declared valuation of the at least one item, wherein there are n+1 possible outcomes and the insured prices for the buyer are set based on the following equation:

$$p_i := p + v_i - \sum_{j=1}^{n+1} z_j v_j,$$

where $p_i$ is the insured price of an item i=1, 2, . . . , n;
$v_i$ is the buyer's declared valuation for item i;
p is an average price set by the seller for the item i;
$z_i$ is the probability of being allocated the item i;
$z_j$ is the probability of being allocated an item other than item i, and $v_j$ is the buyer's declared valuation for that other item; and
randomly drawing an allocation of each of the at least one item to a respective one of the buyers, based on its assigned non-deterministic probability; and
allocating the insured prices to the buyers based on respective outcomes of the random drawing.

* * * * *